Figure 1:
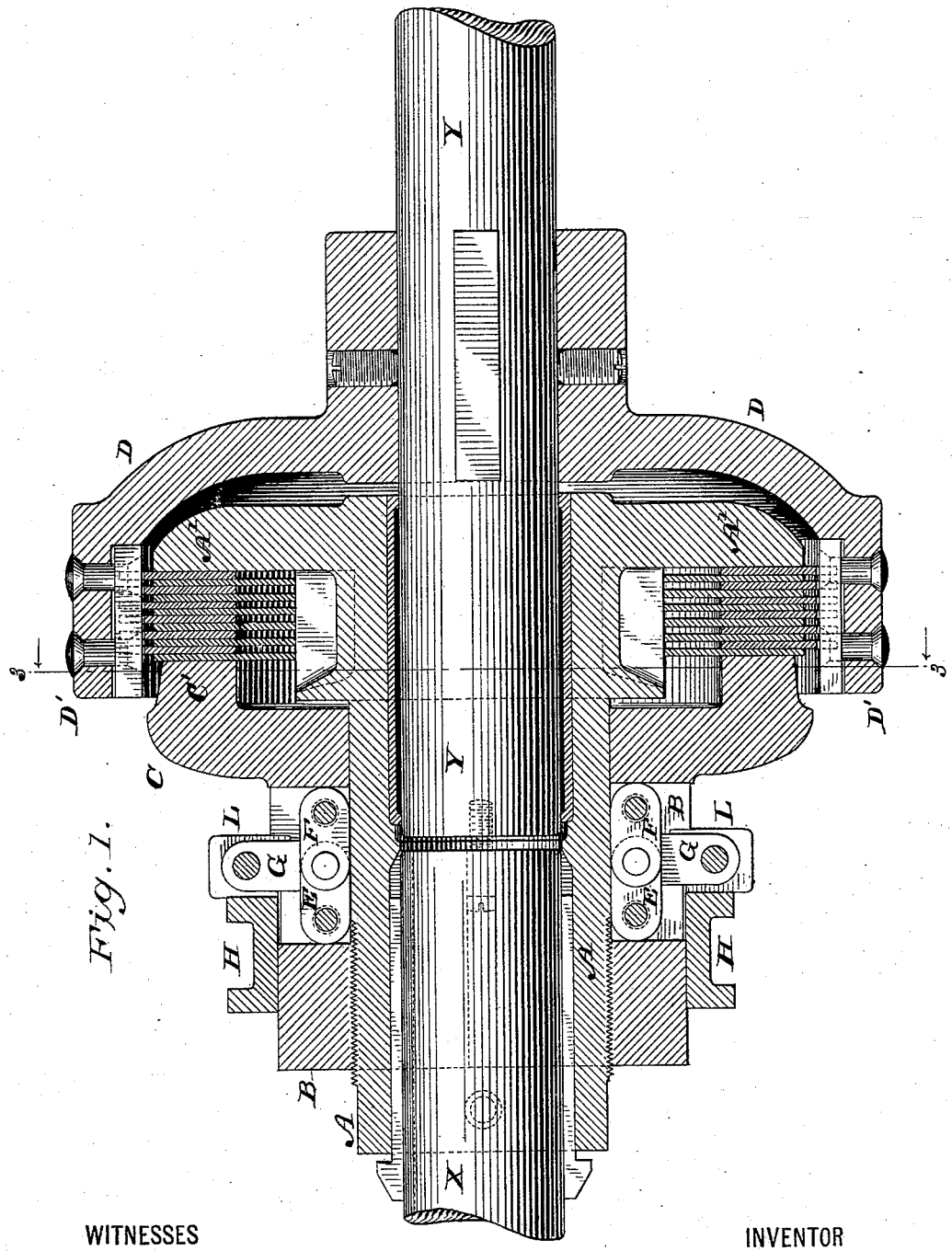

(No Model.)  N. R. KELLEY.  3 Sheets—Sheet 1.
CLUTCH MECHANISM.

No. 305,197.  Patented Sept. 16, 1884.

WITNESSES
Ed. A. Newman.
Cel. C. Newman.

INVENTOR
Norman R. Kelley
By his Attorneys
Baldwin, Hopkins & Peyton.

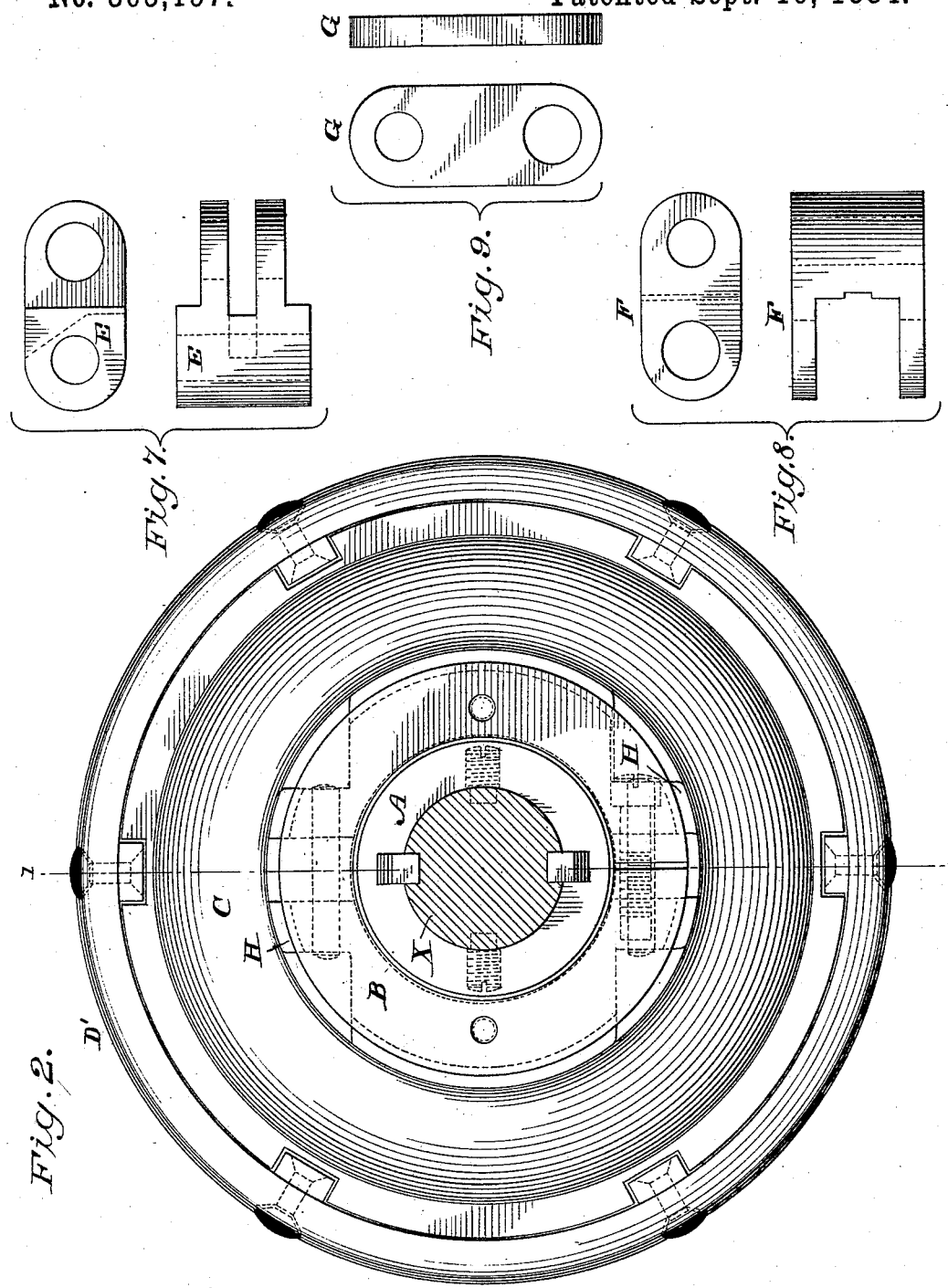

(No Model.) 3 Sheets—Sheet 3.
N. R. KELLEY.
CLUTCH MECHANISM.
No. 305,197. Patented Sept. 16, 1884.
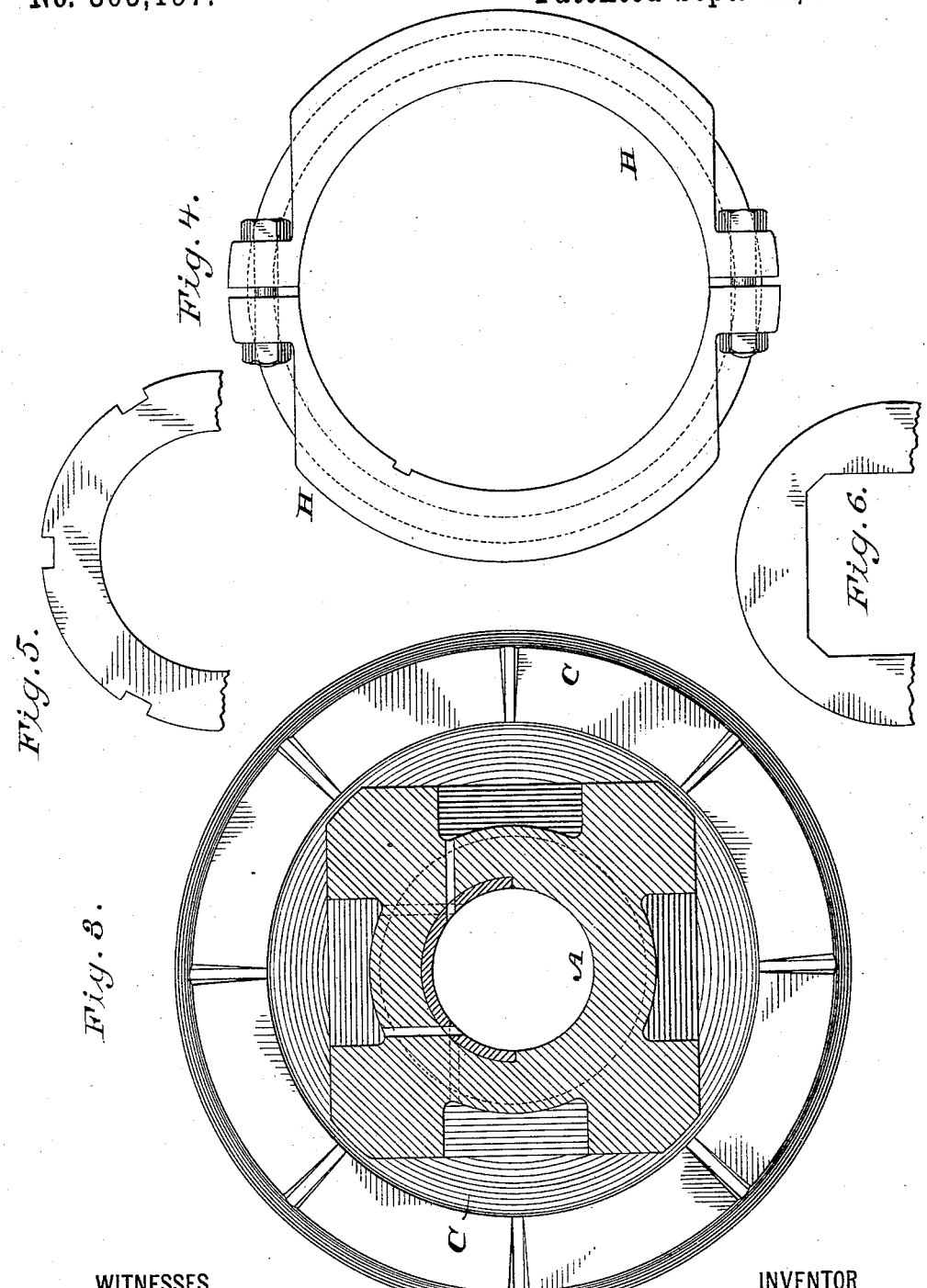
WITNESSES
Ed. A. Newman.
Cel. C. Newman.
INVENTOR
Norman R. Kelley.
By his Attorneys
Baldwin, Hopkins, & Peyton

UNITED STATES PATENT OFFICE.

NORMAN R. KELLEY, OF STAMFORD, CONNECTICUT, ASSIGNOR TO THE YALE & TOWNE MANUFACTURING COMPANY, OF SAME PLACE.

CLUTCH MECHANISM.

SPECIFICATION forming part of Letters Patent No. 305,197, dated September 16, 1884.

Application filed May 26, 1884. (No model.)

*To all whom it may concern:*

Be it known that I, NORMAN R. KELLEY, of Stamford, in the county of Fairfield and State of Connecticut, have invented certain new and useful Improvements in Clutch Mechanism, of which the following is a specification, reference being had to the accompanying drawings.

My improvements relate to mechanism for operation of what are known as "Weston friction disk-clutches," shown in divers United States patents to Thomas A. Weston and Thomas W. Capen, and familiar to those skilled in the manufacture and operation of friction-clutch mechanism; but they are also adapted to operate cone-clutches and others requiring longitudinal pressure.

The general object of my invention is to construct clutches and apply them for coupling and uncoupling shafting, and connecting and disconnecting loose pulleys to and from revolving shafts and the like, in which all the pressure shall be received by the different parts of the clutches themselves, so that there will be no end-pressure on the shaft which is being driven, and of course no end-pressure upon either of the bearings of two shafts having the same axial line to be connected and disconnected by the clutch mechanism. My clutches are therefore what I may call "self-contained;" but I do not claim this principle of construction in clutches to be new.

In the accompanying drawings, Figure 1 represents a vertical section of my improved clutch mechanism applied for connecting and disconnecting two shafts having the same axial line, drawn upon the line 1 1 of Fig. 2. Fig. 2 represents an end elevation of my clutch mechanism with the shaft in section. Fig. 3 represents a section drawn on the line 3 3 of Fig. 1. Fig. 4 is a plan view of the sliding fork, collar detached, which I employ to oprate my clutch mechanism. Fig. 5 is a segment of one of the disks, and Fig. 6 a segment of another disk of different form. Figs. 7, 8, and 9 illustrate details of toggle mechanism for working the clutch mechanism.

Referring to the letters upon the drawings, X indicates one shaft and Y another shaft, which it may be supposed to be desirable to couple together, so that one shaft shall rotate the other.

A indicates a sleeve, which is keyed or otherwise fixed to the shaft X, and always rotates with it. On a square hub (see Fig. 3) of the flange A' of the sleeve A are placed six or any other suitable number of friction-disks of the form, for example, shown in Fig. 6, which are suitably spaced apart, and which always move with the sleeve A.

Keyed or otherwise fixed to the shaft Y is a disk-carrier, D, having a flange, D', projecting up and over the sleeve A, to which flange are attached by keys or otherwise six or any other suitable number of friction-disks of the form, for example, shown in Fig. 5, which alternate with the other disks just last described.

C indicates a pressure-collar, adapted to slide upon the sleeve A, and having a projecting flange, C', adapted to bear against one side of the series of friction-disks. The position of the collar C upon the sleeve A may be adjusted or shifted by any convenient instrumentality adapted for the purpose; but I have shown in the drawings an adjustable fixed ring, B, which engages by a screw-thread with the sleeve A; but I do not claim this as any part of my invention.

Attached to the pressure-collar C, and also to the fixing-ring B, is the toggle E F, operated by the link G, which is carried and moved by the fork-collar H, which is adapted to slide on the fixing-ring B. In the drawings, Fig. 1, the toggle mechanism is shown in the position of operation—that is to say, clutching the disks together and coupling the two shafts. It bears against the fixing-ring B at one end and the pressure-collar C at the other, and moves the latter up against one side of the series of friction-disks, which are clamped between the flange C' and the annular projection A' of the sleeve A. This pressure upon both sides of the series of disks is effected by the clutch itself without applying any longitudinal pressure or strain to either of the shafts to be coupled. The fork-collar H is connected to the link G, and may be operated by a forked lever, in the usual way, to operate the clutch, either for coupling or uncoupling, which is always accomplished by positive action.

Instead of being keyed to the shaft, the disk-carrier D may be attached to or constitute a part of a loose pulley upon the shaft Y, and the clutch mechanism will then operate to connect or disconnect the loose pulley with the shaft in such a way as to cause it to rotate with the shaft or remain idle, as may be desired.

Instead of having the flange A carry a series of disks, and the flange D' also carry a series of disks, which respective sets of disks interlock or alternate with each other, each of these parts might carry any other friction-surface—as, for example, an annular conical-shaped friction-surface carried by one part and a corresponding fitting annular conical-shaped friction-surface carried by the other part; but the series of friction-disks described above have certain well-known advantages in friction-clutch mechanism, and are therefore generally preferable, especially where great strain is encountered. The self-contained clutch principle is also applicable to other clutches than friction-clutches, and mechanism similar to the parts described might cause interlocking action in other ways than by friction between the flanges A' and D', as will be apparent to those familiar with the manufacture and use of clutch mechanism.

I am aware that toggles have been used heretofore for causing the pressure into contact of adjacent friction-surfaces in clutch mechanism; and I do not claim them, broadly. Any suitable mechanism beside that described for moving against and pressing the disks may be employed.

Having described a complete operative clutch embodying my improvements, what I claim to be new therein, and desire to secure by Letters Patent of the United States, is—

1. In a self-contained clutch, a sleeve, A, having the flange or projection A', a flanged carrier, D D', a series of friction-disks carried by these two parts, and a pressure-collar, C C', for pressing the disks together without communicating end-thrust to the shafts, substantially as set forth.

2. In a friction-clutch, the combination of a sleeve carrying a set of disks, a disk-carrier carrying another, a pressure-collar, a toggle, an adjusting-ring, and a fork-collar, substantially as described.

In testimony whereof I have hereunto subscribed my name.

NORMAN R. KELLEY.

Witnesses:
SCHUYLER MERRITT,
GEO. E. WHITE.